United States Patent [19]

Kaesgen

[11] Patent Number: 4,628,757
[45] Date of Patent: Dec. 16, 1986

[54] TRACTOR WHEEL DRIVE CONTROL

[75] Inventor: Juergen Kaesgen, Brunswick, Ohio

[73] Assignee: MTD Products Inc., Cleveland, Ohio

[21] Appl. No.: 623,407

[22] Filed: Jun. 22, 1984

[51] Int. Cl.⁴ .................. G05G 11/00; G05G 1/14
[52] U.S. Cl. ............................. 74/481; 74/474
[58] Field of Search .............. 74/473 R, 474, 481, 74/482, 491, 477, 512

[56] References Cited

U.S. PATENT DOCUMENTS

| 3,316,773 | 5/1967 | Findlay | 74/491 |
| 3,864,914 | 2/1975 | Timmins | 74/481 |
| 4,040,306 | 8/1977 | Jensen | 74/481 |
| 4,064,769 | 12/1977 | Amdall et al. | 74/478 |
| 4,067,426 | 1/1978 | Murphy | 74/512 |
| 4,156,370 | 5/1979 | Callaghan | 74/481 |
| 4,255,984 | 3/1981 | Abels et al. | 74/474 |
| 4,346,617 | 8/1982 | Schroeder et al. | 74/481 |

FOREIGN PATENT DOCUMENTS 148406  1/1955  Sweden ................. 74/478

Primary Examiner—Lawrence Staab
Attorney, Agent, or Firm—Woodling, Krost & Rust

[57] ABSTRACT

This invention relates to the selective interconnection of two plates and a fixed point to provide for a bi-directional rotary motion from a uni-directional linear force.

22 Claims, 6 Drawing Figures

TRACTOR WHEEL DRIVE CONTROL

FIELD TO WHICH INVENTION RELATES

My invention relates to a mechanism which selectively transforms a uni-directional linear activating motion into a bi-directional rotary motion. The mechanism is particularly suitable for use as a direction and speed control in a hydrostatic drive garden tractor.

STATEMENT OF THE INVENTION

It is an object of this invention to reduce the cost and complexity of uni-directional linear motion to bi-directional rotary motion operating mechanisms;

It is an object of this invention to improve the adaptability of bi-directional rotary motion operating mechanisms;

It is an object of this invention to increase the operating efficiency of devices having bi-directional rotary motion operating mechanisms; and It is an object of this invention to provide operators of devices having bi-directional rotary motion operating mechanisms with easily understood and manipulated operating controls.

Other advantages and a fuller understanding of the invention may be had be referring to the following description and claims, taken in conjunction with the accompanying drawings, in which:

FIGURES OF THE DRAWINGS

DESCRIPTION OF THE INVENTION HEREIN DISCLOSED

Figure 1:
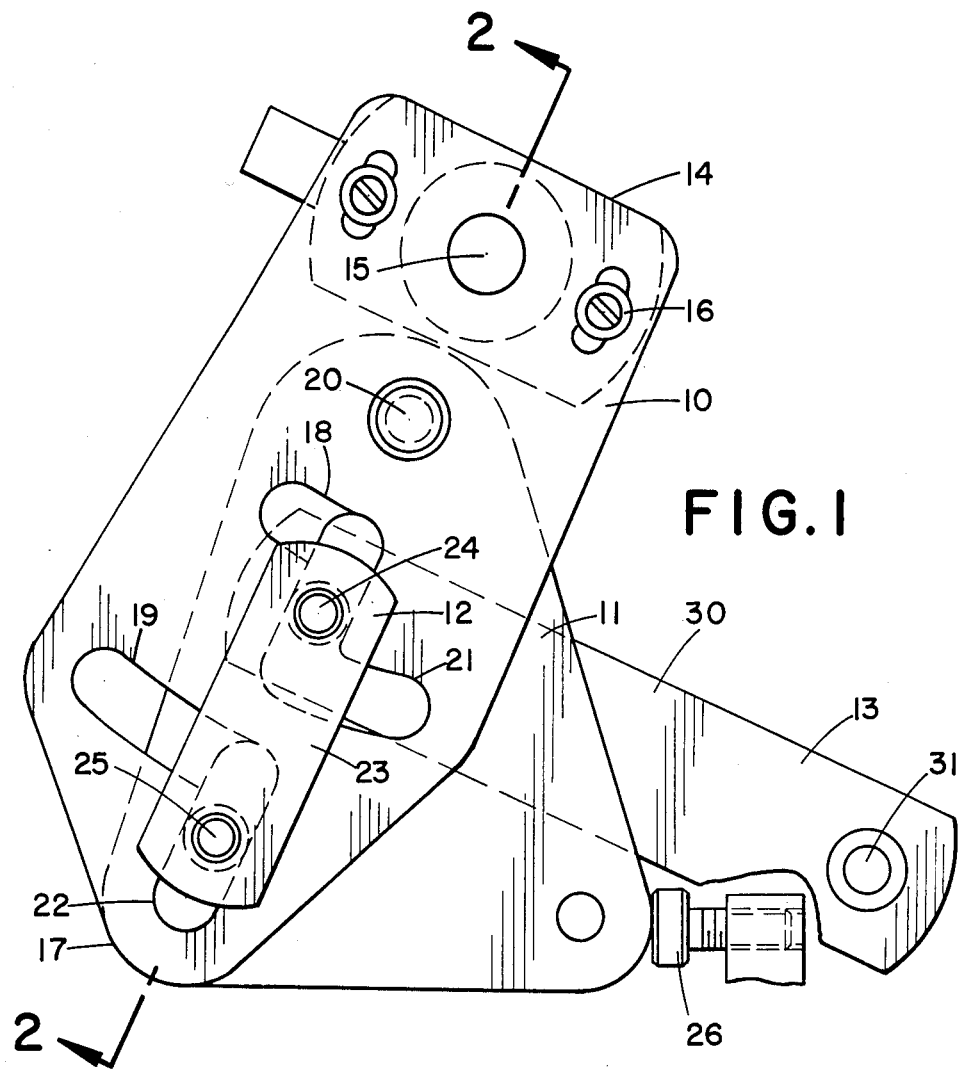
FIG. 1 is a full size top view of an operating mechanism incorporating the invention of the application. The mechanism is shown in a neutral position.
Figure 2:
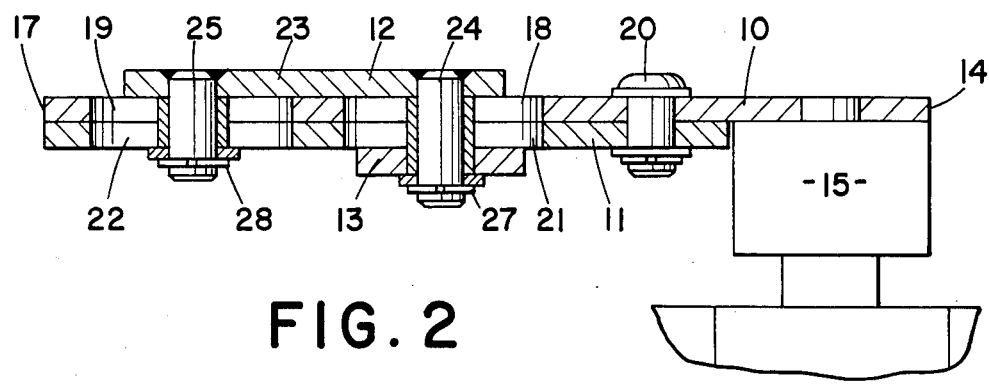
FIG. 2 is a cut-away cross section of the operating mechanism of FIG. 1 taken generally along lines 2—2 of that figure.

The operating mechanism incorporating the invention of this application has an activating plate 10, a connecting plate 11, a pin link 12 and a pivot shift arm 13. See FIG. 1.

The activating plate 10 is connected at one end 14 to a directional-speed control rotary valve 15. The activating plate 10 is fixedly connected to such valve 15 by the screws 16. The other end 17 of the activating plate 10 is unsupported.

The rotary valve 15 controls both the direction (forward-reverse) and speed (fast-slow) of the vehicle with which it is associated. The direction and degree of rotation of the valve accomplishes this control. In the example valve shown, clockwise rotation is forward, counterclockwise reverse. The inbetween position is neutral. The amount of rotation controls the speed according to the greater the degree of rotation the faster the speed of travel. The valve 15 has a built in neutral return force that increases upon hydraulic pressure (i.e. increase in resistance to motion of the vehicle to which the valve is associated.)

Figure 3:
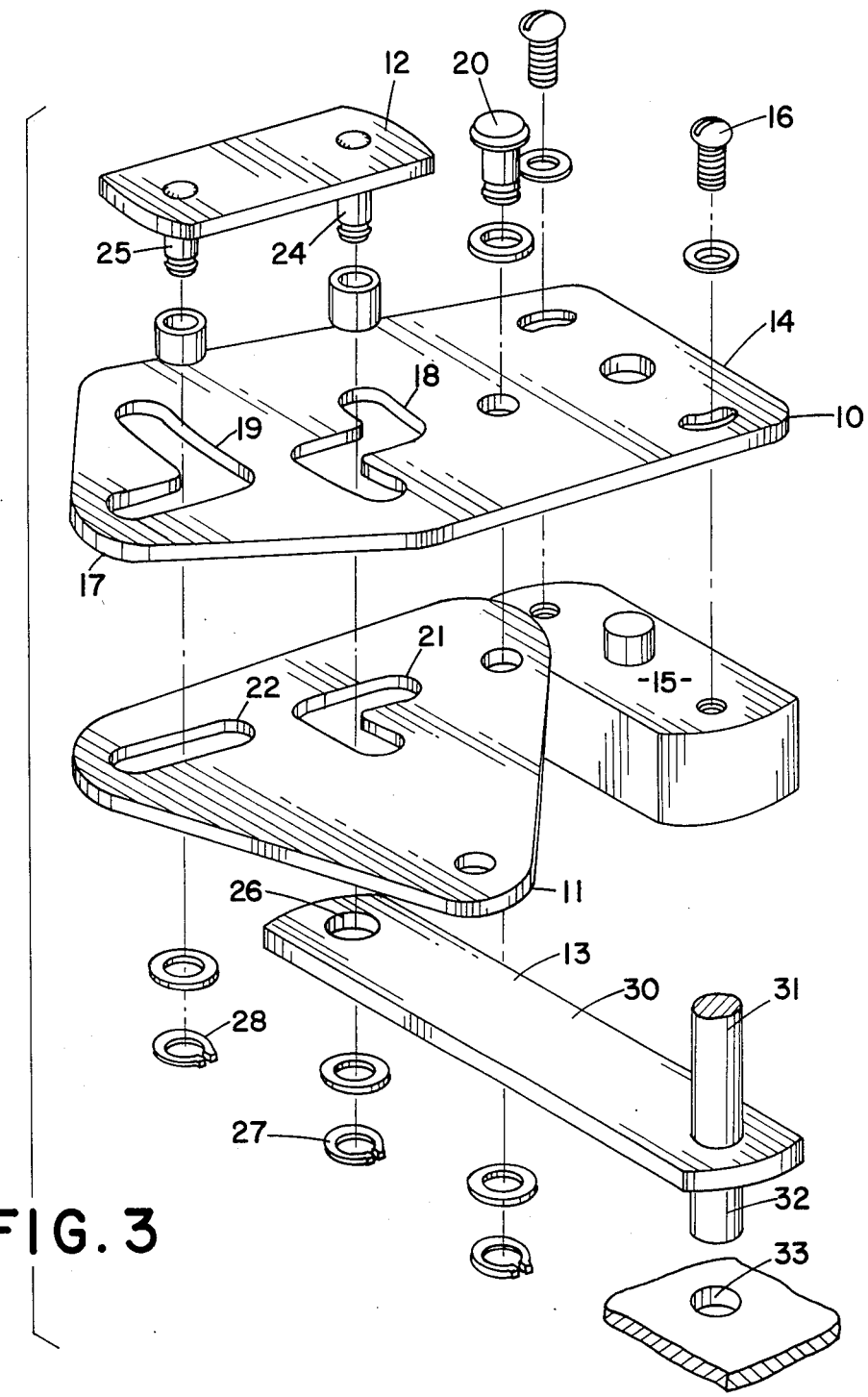
FIG. 3 is a perspective opened up view of the operating mechanism of FIG. 1.

The unsupported end 17 of the activating plate 10 has a generally inverted "S" shaped forward-reverse groove 18 and a generally "L" shaped lock up groove 19 formed therein, (See FIG. 3). The utility of these grooves 18, 19 will be later described.

The connecting plate 11 is rotatably connected to the underside of the activating plate 10 near the rotary valve 15 by the pin 20. The connecting plate 11 pivots about the pin 20 in respect to the activating plate 10. The connecting plate 11 and activating plate 10 can be rotated together as a unit about the rotary valve 15.

The connecting plate 11 has a generally "L" shaped groove 21 and a straight lock up groove 22 formed therein (see FIG. 3). The utility of these grooves 21, 22 will be later described.

The pin link 12 has a body portion 23 and two downwardly extending pins 24, 25. The pin link 12 is located above the activating plate 10. One pin 24 extends through the generally "S" shaped forward-reverse groove 18 in the activating plate 10 and the generally "L" shaped groove 21 in the connecting plate 11 into a hole 26 in the pivot shift arm 13 (to be later described). The other pin 25 extends through the generally "L" shaped lock up groove 19 in the activating plate 10 and the straight lock up groove 22 in the connecting plate. Push on locking washers 27, 28 on the pins 24, 25 retain the pin link 12 in place.

The pivot shift arm 13 has a body portion 30 and a shift arm portion 31. The shift arm portion 31 includes a stub shaft 32. This stub shaft 32 fits into a corresponding hole 33. This hole 33 is in a fixed position in respect to the valve 15. The hole 33 forms an attachment point for the shift arm 13. Normally the valve 15 and the hole 33 are both part of a hydrostatic transmission (not shown). The body portion 30 of the pivot shift arm 13 pivots about the axis of the stub shaft 32 depending on the movement of the shift arm portion 31.

The movement of the shift arm 13 controls the location of the pin link 12 in respect to the connecting plate 11 and the activating plate 10.

Figure 5:
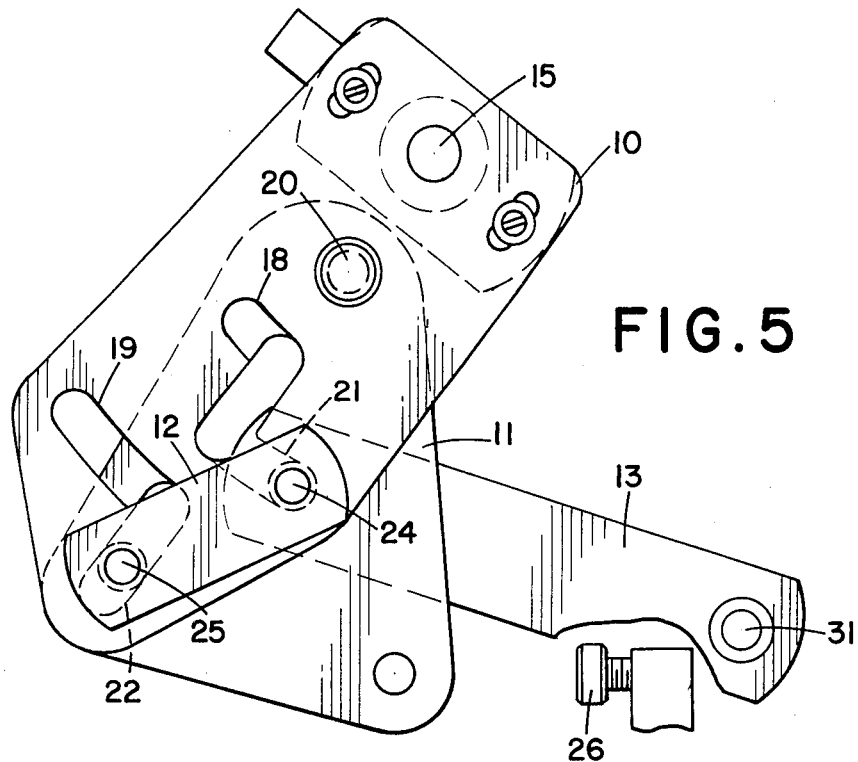
FIG. 5 is a half size top view of the operating mechanism of FIG. 1 in a forward position.

If the shift arm 13 is moved in one direction the pin 25 of the pin link 12 moves into the generally "L" shaped lock up groove 19 in the activating plate 10 and the straight lock up groove 22 in the connecting plate 11 (See FIG. 5). This location of the pin 25 locks the connecting plate 11 to the activating plate 10 such that the two plates move together as a single unit. Any movement of the connecting plate 11 automatically moves the activating plate 10 in the same direction for the same distance.

Figure 6:
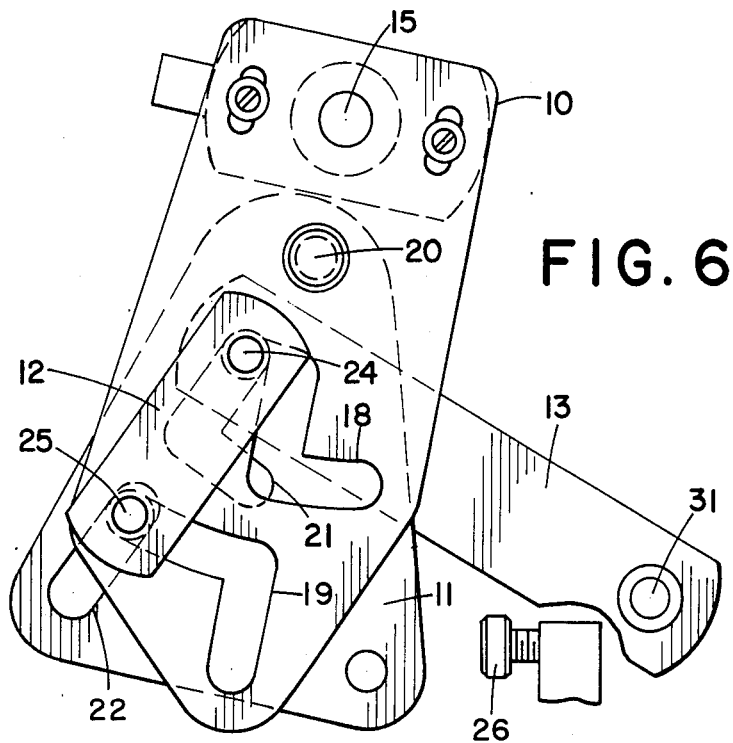
FIG. 6 is a half size top view of the operating mechanism of FIG. 1 in a reverse position.

If the shift arm 13 is moved in the other direction, the pin 24 of the pin link 12 moves into the top of the generally "L" shaped groove 21 in the connecting plate 11 and the top part of the "S" shaped forward-reverse groove 18 in the activating plate 10 (See FIG. 6). This location of the pin 24 creates a pivot point for the connecting plate 11 while allowing relative motion between the connecting plate 11 and the activating plate 10. Due to this pivot point any movement of the connecting plate 11 automatically moves the activating plate in the opposite direction. Due to the location of the pivot point (on the other side of the pin 20 from the rotary valve 15 with unequal spacing therebetween), the amount of movement is different.

If the shift arm 13 is left in its center position, the pins 24, 25 combine with the grooves 18, 19, 21 and 22 to provide a neutral position (FIG. 1). In this neutral position the shift arm 13 can move the pins 24, 25 in their respective grooves 18, 21 and 19, 22 and the valve 15 is in a non-operating or neutral position. [To insure that this occurs, during the assembly of the device the operating mechanism is located generally in position with the activating plate 10 on the valve 15 and the shift arm 13 in the hole 33. The screws 16 are in place but not tightened down. The activating plate 10 and the connecting plate 11 are then positioned such that the shift arm 13 can freely move the pins 24, 25 in their respective grooves (i.e. the shift arm 13 can freely pivot from its forward to reverse positions). A neutral stop 26 is then adjusted to provide a stop in this position. After this is accomplished the valve 15 is rotated until it also is in a neutral position. The screws 16 are then tightened down to lock in this neutral to neutral relationship.]

Note that because the grooves 18, 19 and 21 include arcuate sections the operating mechanism must be in a neutral position before the operator can shift between forward and reverse.

Figure 4:
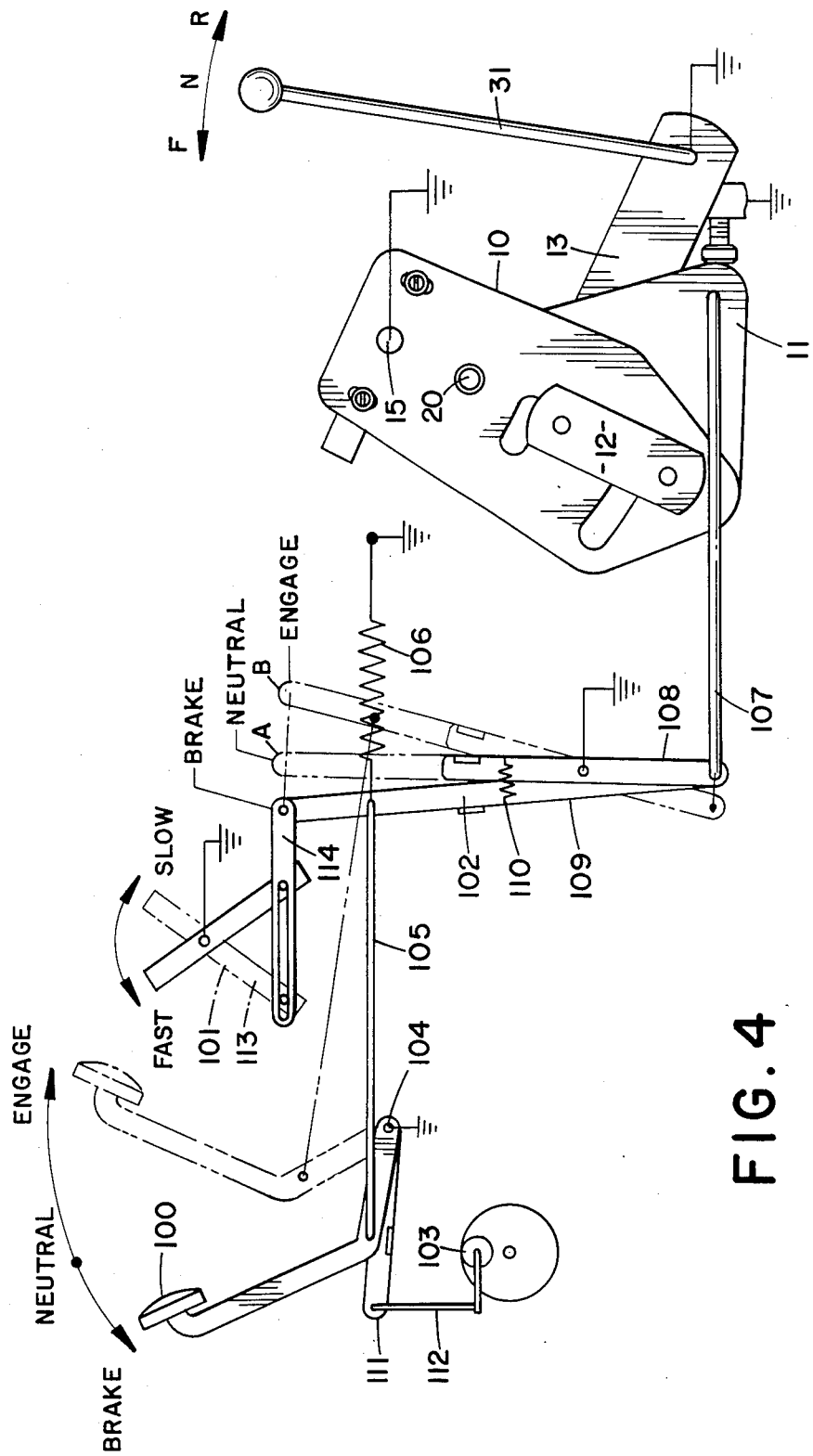
FIG. 4 is a schematic view of a linear control mechanism for the operating mechanism of FIG. 1.

The control mechanism is used with associated components (shown in schematic form in FIG. 4). These components include a motion-brake pedal 100, a speed control 101, an interconnect mechanism 102 and a brake 103.

The motion-brake pedal 100 is pivoted at 104 to the associated vehicle. The motion-brake pedal 100 is movable between brake and engaged positions. A neutral position is intermediate these two positions. For engagement, the motion-brake pedal 100 is connected by a rod 105 to the interconnect mechanism 102. The rod 105 is connected to the motion-brake pedal 100 in an over pivot center type connection. For this reason the movement of the rod 105 (and interconnect mechanism 102) is non-linear with the movement of the motion-brake pedal 100. (Off of neutral it takes considerable motion on the part of the motion-brake pedal 100 to move the rod 105 a small distance. Thereafter the relationship becomes more linear.) Due to the spring 106 the pedal 100 prefers to be in engaged position (shown in dotted lines in FIG. 4).

The powerful spring 106 on the other side of the interconnect mechanism biases the motion-brake pedal 100 and the interconnect mechanism 102 into an engaged drive position.

The interconnect mechanism 102 forms a lost motion type connection between the motion-brake rod 105 and the main activating rod 107. From neutral to the engaged position of the motion-brake pedal 100 the interconnect mechanism directly transfers movement of the motion-brake rod 105 into movement of the main activating rod 107. (In this transfer the interconnect mechanism 102 moves from dotted line position A to dotted line position B in FIG. 4). At neutral one part 108 of the interconnect mechanism 102 physically stops. The other part 109 of the interconnect mechanism 102 can move a further 5° or so. This motion insures that the vehicle is in neutral before the brake (to be later described) is applied. A small spring 110 biases the two parts 108,109 of the interconnect mechanism 102 together.

A small auxiliary lever 113 controls the relative movement of the interconnect mechanism 102. An eyelet rod 114 connects the lever 113 to the interconnect mechanism 102. In the "fast" position of the lever 113 (solid line in FIG. 4) the interconnect mechanism 102 can freely move its full design distance; the eyelet rod 114 is not of any effect. In other than the "fast" position of the lever 113 (dotted line in FIG. 4) the movement of the interconnect mechanism 102 becomes increasingly limited; the eyelet rod 114 eventually prevents all but a very restricted motion of the interconnect mechanism 102. The auxiliary lever 113 is thus the main speed control of the control mechanism.

For braking, the motion-brake pedal 100 is connected by a pivoted lever 111 and a brake rod 112 to the brake 103. The motion-brake pedal 100 contacts the pivoted lever 111 shortly after its passage through neutral. From a little after neutral into braking, the pivoted lever 111 and the brake rod 112 directly transfer movement of the motion-brake pedal 100 into movement of the brake 103. This braking action stops the vehicle to which the control mechanism is attached. A parking brake mechanism (not shown) releasably locks the motion-brake pedal 100 in the braked position.

The main activating rod 107 is connected to the connecting plate 11 of the operating mechanism. The operating mechanism translates the linear motion of this activating rod 107 into bi-directional rotary motion of the rotary valve 15. The direction of movement of the valve is chosen by the pivot shift arm 13. If the pivot shift arm 13 is moved into its "forward" position, the connecting plate 11 is locked to the activating plate 10 such that these plates 11, 10 move in the same direction for the same distance (see FIG. 5). Because of this, any motion of the pedal 100 off of neutral towards engage will be directly transferred by the control mechanism into clockwise motion of the rotary valve 15—the vehicle to which the mechanisms are attached will go forward. If the pivot shift arm 13 is moved into its "reverse" position, the connecting plate 11 is free to move in respect to the activating plate 10 and pivots about pin 24. The plates 11,10 move in opposing directions for differing distances (see FIG. 6). Because of this, any motion of the pedal 100 off of neutral towards engage will be indirectly transferred into counter clockwise motion of the rotary valve 15—the vehicle to which the mechanisms are attached will go backward. If the pivot shift arm 13 is moved into its "neutral" position, the plates 11, 10 do not move at all (see FIG. 1). Because of this, any motion of the pedal 100 will have no effect on the rotary valve 15—the vehicle to which the mechanisms are attached will remain stationary.

Other control mechanisms are also possible. In all cases the relative locations of the pivot points and points of attachment are chosen to provide the desired operational characteristics.

Although this invention has been described in its preferred form with a certain degree of particularity, it is to be understood that numerous changes may be made without departing from the invention as hereinafter claimed.

What is claimed is:

1. In a device having a uni-directional activating force for actuating a bi-directional control mechanism, an improved actuator comprising an activating plate, first means to operatively connect said activating plate at a first point to said bidirectional control mechanism, a connecting plate, second means to operatively transmit the uni-directional activating force to said connecting plate at a second point, and third means to select either a first alternative of pivotly connecting said connecting plate to said activating plate at a third point and also pivotly connecting said connecting plate to a fourth point, said fourth point being located substantially intermediate said second and third points, or to select a second alternative of fixedly connecting said connecting plate to said activating plate, said first alternative of said third means providing for one directional movement of said bi-directional control mechanism and said second alternative of said third means providing for the other directional movement of said bi-directional control mechanism for an equivalent uni-directional activating force.

2. The device of claim 1 characterized in that the uni-directional activating force is linear and said bi-directional control mechanism is rotary.

3. The device of claim 1 characterized in that said fourth means at said third point is controlled by the movement of a single shift arm connected to a pin fixed in space.

4. The device of claim 1 wherein said second means operatively transmitting the uni-directional activating force to said connecting plate is moveable and characterized by the addition of stop means, said stop means limiting the range of movement of said second means.

5. The device of claim 1 wherein said second means operatively transmitting the uni-directional activating force is moveable and characterized in that said second means includes a nonlinear interconnect means whereby the amount of movement of said second means is nonlinear.

6. The device of claim 1 characterized in that said second means operatively transmitting the uni-directional activating force to said connecting plate includes a lost-motion type connection whereby the uni-directional activating force is not always transmitted to said connecting plate by said second means.

7. The device of claim 6 characterized by the addition of a brake, said brake being activated by said second means during a period when the uni-directional activating force is not being transmitted to said connecting plate.

8. In a device having a linear uni-directional activating force for actuating a bi-directional control mechanism, an improved activator comprising an activating plate, first means to operatively connect said activating plate at a first point to said bi-directional control mechanism, a connecting plate, second means to pivotly connect said connecting plate to said activating plate at a third point, third means to operatively transmit the linear activating force to said connecting plate at a second point, said third point being substantially between said first and second points, fourth means to select either a first alternative of connecting said connecting plate pivotly to a fourth point whereby said connecting plate can pivot relative to said activating plate or a second alternative of connecting said connecting plate fixedly to said activating plate, and said fourth point being substantially intermediate said second and third points, the first alternative of said fourth means providing for one direction of said bi-directional control mechanism and said second alternative of said fourth means providing for the other direction movement of said bi-directional control mechanism for equivalent uni-directional activating forces.

9. The device of claim 8 characterized in that the uni-directional activating force is linear and said bi-directional control mechanism is rotary.

10. The device of claim 8 characterized in that said fourth means includes a shift arm link, said shift arm link extending between a point fixed in space and said connecting plate.

11. The device of claim 8 wherein said third means to operatively transmit the linear force to said connecting plate is moveable and characterized by the addition of stop means, said stop means limiting the range of movement of said third means.

12. The device of claim 8 wherein said third means to operatively transmit the linear activating force is moveable and characterized in that said third means includes a nonlinear interconnect means whereby the amount of movement of said third means is nonlinear.

13. The device of claim 8 characterized in that said third means to operatively transmit the linear activating force to said connecting plate includes a lost-motion type connection whereby the linear activating force is not always transmitted to said connecting plate by said third means.

14. The device of claim 13 characterized by the addition of a brake, said brake being activated by said third means during a period when the linear activating force is not being transmitted to said connecting plate.

15. In a device having a uni-directional linear activating force for actuating a rotary bi-directional control mechanism, an improved actuator comprising an activating plate, said activating plate having an end, said end of said activating plate being fixedly connected to said rotary bi-directional control mechanism, a connecting plate, said connecting plate having two ends and a middle, one said end of said connecting plate being pivotly connected to said activating plate, said uni-directional linear activating force being operatively transmitted to the other said end of said connecting plate, said end of said activating plate and said one end and said middle of said connecting plate being substantially in line with each other, an attachment means fixed at a point in space in respect to said rotary bi-directional control mechanism, a pin link, first means to connect said pin link to said attachment means, said pin link being selectively movable between two positions, one position of said pin link locking said connecting said connecting plate in respect to said activating plate while also allowing motion between said locked connecting plate and activating plate and said attachment means, the other position of said pin link allowing relative motion between said connecting plate and said activating plate while also pivotly connecting the middle of said connecting plate to said attachment means, a shift means, said first means connecting said shift means to said pin link and said shift means being operable to selectively shift said pin link providing for one directional movement of said rotary bi-directional control mechanism and said other position of said pin link providing for the other directional movement of said rotary bi-directional control mechanism for equivalent uni-directional linear activating movements.

16. The device of claim 15 characterized in that said first means to connect said pin link to said attachment means is a pivot shift arm, said pivot shift arm having two ends, one end of said pivot shift arm being pivotly connected to said pin link, the other end of said pivot shift arm being pivotly connected to said attachment means, and wherein said shift means is connected to said pivot shift arm.

17. The device of claim 15 wherein the uni-directional linear activating force moves and characterized by the addition of stop means, said stop means limiting the range of movement of the uni-directional linear activating force.

18. The device of claim 15 wherein said the uni-directional linear activating force moves and is created by a moveable petal and characterized by the addition of a nonlinear interconnect means between the petal and said other said end of said connecting plate whereby the amount of movement of said connecting plate is nonlinear in respect to the movement of the petal.

19. The device of claim 15 wherein the uni-directional linear activating force moves and is created by a moveable petal and characterized by the addition of a lost-motion type connection means between the petal and said other said end of said connecting plate whereby the movement of said petal is not always transmitted to said connecting plate.

20. The device of claim 19 characterized by the addition of a brake, said brake being activated by said petal during a period when the movement of the petal is not being transmitted to said connecting plate.

21. In a device having a uni-directional activating force for actuating a bi-directional control mechanism, an improved actuator comprising an activating plate, first means to operatively connect said activating plate at a first point to said bi-directional control mechanism, a connecting plate, second means to operatively transmit said uni-directional activating force to said connecting plate at a second point, and third means to select either a first alternative of pivotly connecting said connecting plate to said activating plate at a third point and also pivotly connecting said connecting plate to a fourth point, the rotative axis of the pivot connections at said third and fourth points being substantially parallel to each other, said fourth point being located substantially intermediate said second and third points, or to select a second alternative of fixedly connecting said connecting plate to said activating plate, said first alternative of said third means providing for one directional movement of said bi-directional control mechanism and said second alternative of said third means providing for the other directional movement of said bi-directional control mechanism for an equivalent uni-directional activating force.

22. In a device having a uni-directional activating force for actuating a bi-directional control mechanism, an improved actuator comprising an activating plate, first means to operatively connect said activating plate at a first point to said bi-directional control mechanism, a connecting plate, second means to operatively transmit said uni-directional activating force to said connecting plate at a second point, and third means to select either a first alternative of pivotly connecting said connecting plate directly to said activating plate at a third point and also pivotly connecting said connecting plate to a fourth point whereby said connecting plate can pivot relative to said activating plate, said fourth point being located substantially intermediate said second and third points, or to select a second alternative of fixedly connecting said connecting plate directly to said activating plate, said first alternative of said third means providing for one directional movement of said bi-directional control mechanism and said second alternative of said third means providing for the other directional movement of said bi-directional control mechanism for an equivalent uni-directional activating force.

* * * * *